United States Patent [19]

Norz et al.

[11] Patent Number: 5,214,638
[45] Date of Patent: May 25, 1993

[54] DIGITAL COMMUNICATION ELECTRICAL/OPTICAL ACCESS NODE HAVING BUFFER MEMORY MATRIX FOR SWITCHABLE MULTI-CHANNEL BIDIRECTIONAL TRANSMISSION

[75] Inventors: Albert Norz; Albrecht Schaffert, both of Gerlingen; Werner Beisel, Altenstadt; Kalman Szechenyi, Spiegelberg, all of Fed. Rep. of Germany

[73] Assignee: Alcatel, N.V., Amsterdam, Netherlands

[21] Appl. No.: 610,524

[22] Filed: Nov. 8, 1990

[30] Foreign Application Priority Data

Nov. 13, 1989 [DE] Fed. Rep. of Germany ....... 3937738

[51] Int. Cl.$^5$ ............... H04Q 11/08; H04Q 11/04
[52] U.S. Cl. ................................. 370/58.1; 370/66; 370/95.3; 359/135
[58] Field of Search .................... 370/58.1, 58.2, 58.3, 370/60, 61, 65, 66, 68, 84, 95.3, 112; 340/825.79, 825.83, 825.03; 379/291, 292, 306; 359/135, 139

[56] References Cited

U.S. PATENT DOCUMENTS

| | | | |
|---|---|---|---|
| 3,891,807 | 6/1975 | Charransol et al. | 370/65.5 |
| 4,108,546 | 4/1980 | Schlichte | 370/65.5 |
| 4,484,327 | 11/1984 | Hanson | 370/84 |
| 4,575,839 | 3/1986 | Ogata et al. | 370/58.1 |
| 4,628,506 | 12/1986 | Sperlich | 370/95.3 |
| 4,748,615 | 5/1988 | Kruger et al. | 370/58.1 |
| 4,760,570 | 7/1988 | Acampora et al. | 370/60 |
| 4,768,188 | 8/1988 | Barnhart et al. | 370/95.3 |
| 4,788,680 | 11/1988 | Kikuchi et al. | 370/58.1 |
| 4,821,258 | 4/1989 | Fraser | 370/60 |
| 4,833,670 | 5/1989 | Lebisay et al. | 370/58.1 |
| 4,969,149 | 11/1990 | Killat et al. | 370/60 |
| 4,973,956 | 11/1990 | Lin et al. | 379/292 |
| 5,007,049 | 4/1991 | Ohtsuka | 310/58.1 |

FOREIGN PATENT DOCUMENTS 8909521 10/1989 World Int. Prop. O. .

Primary Examiner—Douglas W. Olms
Assistant Examiner—H. Kizou
Attorney, Agent, or Firm—Ware, Fressola, Van Der Sluys & Adolphson

[57] ABSTRACT

The network access node of a digital communication system for the bidirectional transmission of message signals between, for example, a switching center and subscribers as an electrically switchable connection between the lines to the switching centers with a first interface and the lines to the subscribers with a second interface. The first interface is preferably an interface for a time-division multiplex signal with a transmission rate of 2 Mbit/s; the second interface is preferably an interface for signals in multiple access with time-division multiplex (TDM/TDMA). The buffer memory of the TDM/TDMA system is made up of partial memories arranged as a matrix. The partial memories are used simultaneously as a buffer memory for the circuit of the paths.

13 Claims, 3 Drawing Sheets

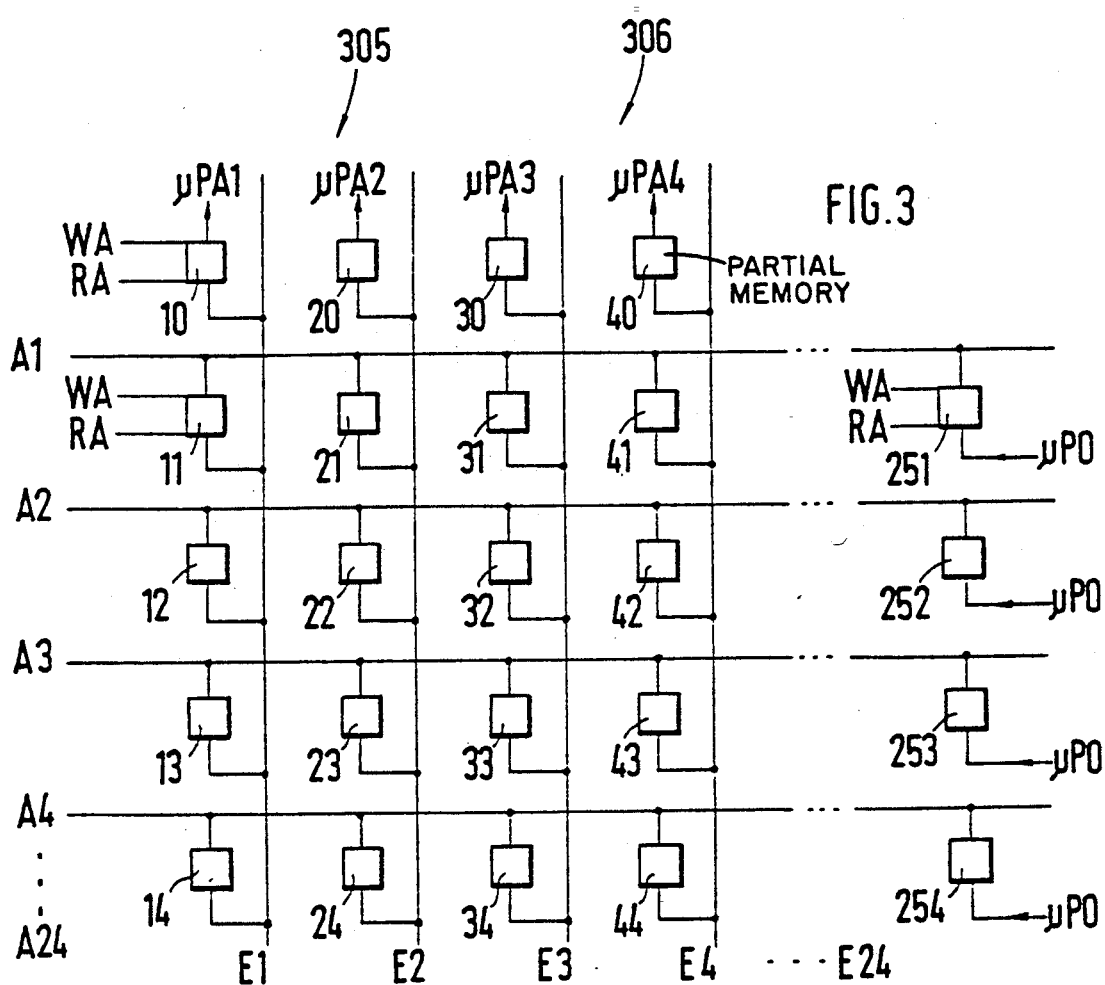
FIG.3
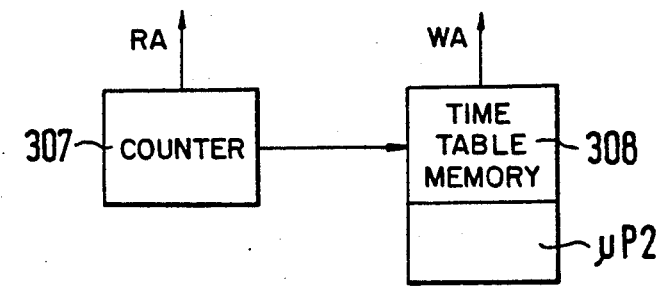

DIGITAL COMMUNICATION ELECTRICAL/OPTICAL ACCESS NODE HAVING BUFFER MEMORY MATRIX FOR SWITCHABLE MULTI-CHANNEL BIDIRECTIONAL TRANSMISSION

BACKGROUND OF THE INVENTION

1. Field of the Invention

The present invention relates to a network access node of a digital communication system for the two-way transmission of message signals.

2. Description of the Prior Art

The term 'network access node' refers to the unit of a digital communication system in which the message signals coming, for example, from a switching center, are processed for transmission to the individual subscriber terminals, taking into consideration the available transmission network. In this process, lines are frequently present on the side of the network access node facing the subscriber terminals in which several lines of a switching center are combined. If fewer channels are required in the front-end equipment than are available to it from the switching center, channels in the switching center are nevertheless assigned to the front-end equipment and are of no use to any subscriber.

An optical communication system is known from European Patent 0 318 331 A1 in which communication between the network node interface and subscribers is carried out by means of a TDM multiplex procedure in the downstream direction and a TDMA multiplex procedure in the upstream direction. In addition, the assignment of the lines of, for example, switching centers and front-end devices, are switchable by means of active optical couplers, which are located between the network node interface and the front-end devices.

However, couplers of this type permit only a switchover between lines of, for example, switching centers and a limited number of front-end devices if the number of optically-active couplers is to be restricted to a commercially-acceptable level.

SUMMARY OF THE INVENTION

The invention is based on the task of creating a different, less expensive switchable network access node for use in a digital communication system for two-way transmission of message signals between first equipment, particularly equipment with datex connections, equipment with telecontrol connections, or equipment permanently connected to the network access node, on one side, and to second equipment, particularly subscriber terminals on another side. A first type of lines on said one side has a first interface for time-division multiplex digital signals of a particular stage of the time-division multiplex hierarchy. A second type of lines of said other side has a second interface for one direction of transmission and for a particular transmission rate. Buffer memories are provided for converting the time-division multiplex digital signals of lines of the first type into time-division multiplex digital signals for lines of the second type and vice versa. Transmission paths between the two types of lines are switchable in the network access node. For storing message signals to switch the transmission paths between the two types of lines and for forming the time-division multiplex digital signals, the buffer memory have partial memory portions with memory cells.

The buffer memory consists of a first portion and a second portion, each having a plurality of addressable partial memories arranged in the form of a matrix. The partial memories of each row of the matrix are connected in parallel to one input, and the partial memories of each column of the matrix to one output, or vice versa.

A particular advantage of the invention is that time slots in the time-division multiplex procedure for individual subscriber terminals can be switched between the subscriber terminals and the switching centers in any desired assignment and order.

DESCRIPTION OF THE DRAWINGS

FIG. 3 is a block diagram of a buffer memory responsible for transmission in an upstream direction, by means of which the transformation of the time-division multiplex digital signal and the switching of the connections are carried out.

DETAILED DESCRIPTION OF THE PREFERRED EMBODIMENT

Figure 1:
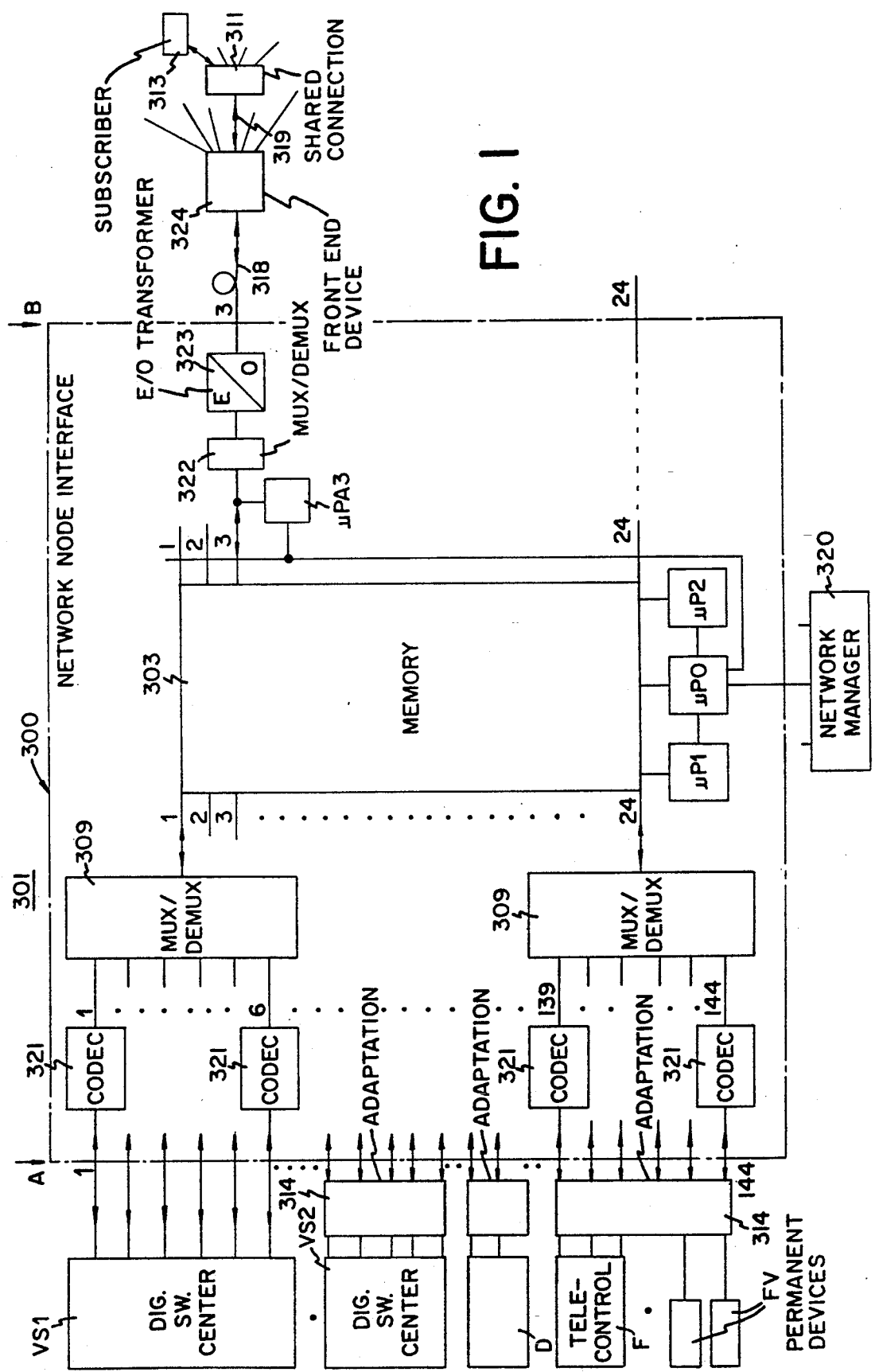
FIG. 1 is a block diagram of an optical message system containing a network access node according to the invention.

FIG. 1 shows an exemplifying embodiment of a digital optical transmission system 301 with the network access node 300 according to the invention. In the center of the figure, the network access node 300 is framed by a dot-and-dash line. On the left side there is a digital switching center VS1 with 2-Mbit/s multiplex outputs, a digital switching center VS2 with other outputs (which could also be replaced by a different analog switching center), a device D with a datex connection, a device F with a telecontrol connection, and devices FV permanently connected with the network access node. The above-mentioned devices can also be assembled in any other desired manner.

The lines of the network access node facing these devices uniformly show the same interface A and are intended for digital 2 Mbit/s time-division multiplex signals with a frame duration of 125 usec. In order for all of the above-mentioned devices to meet this interface condition, it is provided that, between the digital switching center VS2 (analog switching center), the datex connection D, the telecontrol connection F and the permanent connections FV, as far as is required, there is located an adaptation circuit 314 which adapts the transmission rate of the connections to the desired 2 Mbit/s and optionally, if analog signals are present, carries out an analog-digital transformation. These adaptation circuits 314 are known in themselves.

On the right-hand side, to represent several front-end devices, there is shown a front-end device 324 which, together with several shared connections, of which again only one shared connection 311 is shown, forms a group of shared connections. The shared connections 311 are connected via optical waveguides 319 to the front-end device 324. Several subscriber terminals 313 are, in turn, assigned to each shared connection 311. Switching centers can also be considered as subscriber terminals. Each front-end device 324 is connected to the network access node 300 via an optical waveguide 318.

The transmission rate of the optical waveguide 318 has a net value of 12 Mbit/s, so that a uniform transmission rate is present at the interface B of the network access node 300. The duration of the frame clock is 1 millisecond.

The optical network access node 300 thus contains two types of lines, the first type, with 144 electrical 2 Mbit/s lines at the interface A, and the second type, with 24 optical 12 Mbit/s lines, at the interface B.

In the network access node 300, the signals applied to the lines 1-144 of interface A must be switchable to the lines 1-24 of interface B. The signals received at the lines 1-144 are usually time-division multiplex (TDM) signals. The same applies to the output signals appearing at the lines 1-24 of interface B, and to the reverse direction. In the embodiment being described, in the reverse direction, time-division multiple access (TDMA) signals are fed into the lines 1-24 of interface B. The function of the network access node 300 is to form new time-division multiplex signals from the incoming TDM or TDMA signals by combining any components of the incoming TDM or TDMA signals in any arbitrarily controllable sequence into a new TDM signal, and to output the latter at one of the lines of the opposite interface.

Figure 2:
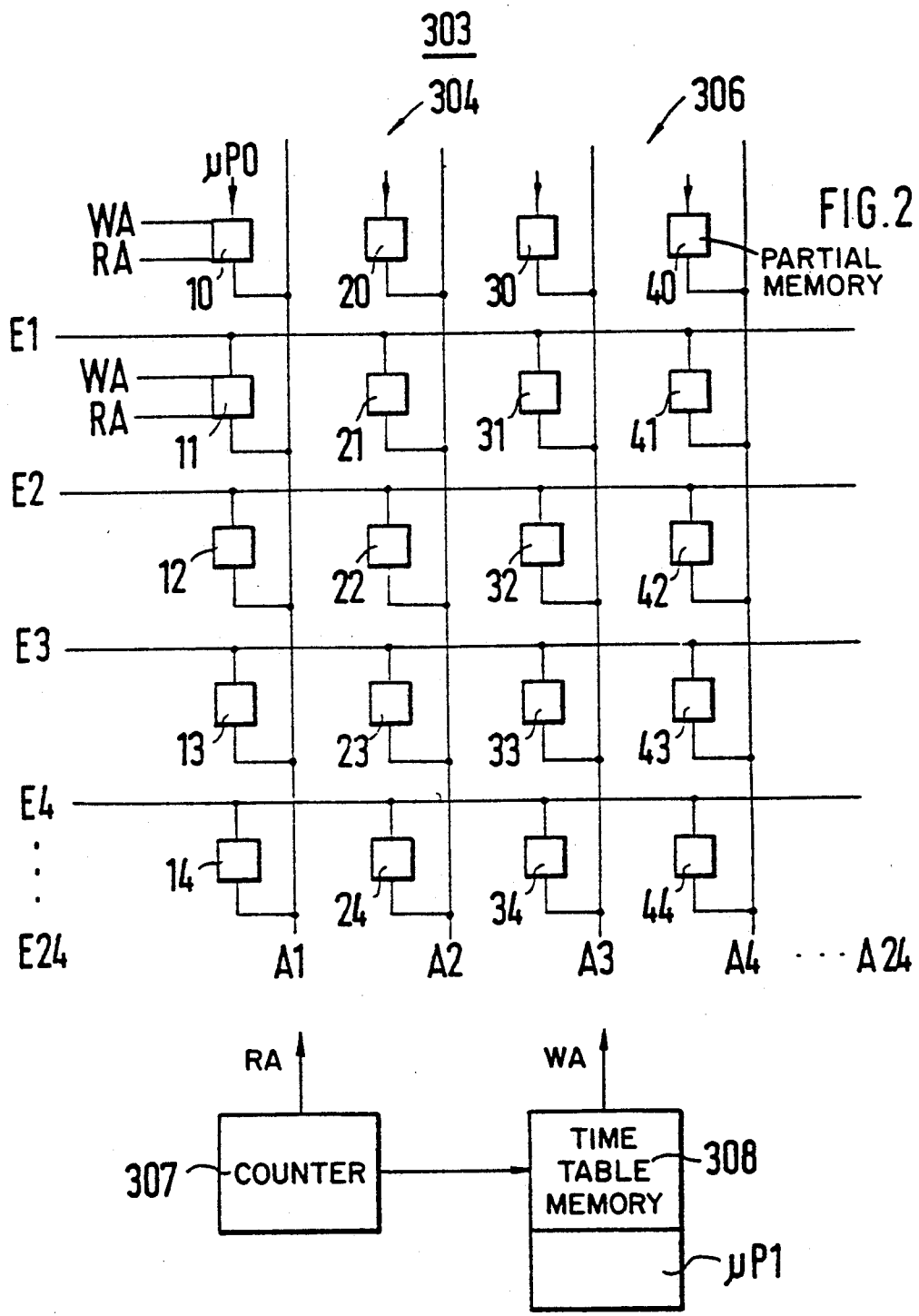
FIG. 2 is a block diagram of a buffer memory responsible for transmission in a downstream direction, by means of which the transformation of the time-division multiplex digital signal and the switching of the connections are carried out.

The requirement is met by the special design of the buffer memory 303. In order to make the operation of the buffer memory 303 more easily understandable, we shall first explain the compliance with the individual requirements in the downstream direction with reference to FIG. 2.

The first part 304 of the buffer memory 303 contains a number of partial memories 11, 21, 31, 41, . . . ; 12, 13, 4, . . . , forming a matrix 306. The inputs E1-E24 are in each case parallel to 24 partial memories 11, 21, 31, 41, . . . ; 12, 22, 32, 42, . . . ; 13, . . . ; . . . , arranged in a row. The signal outputs A1-A24 are parallel to each column of partial memories 11, 12, 13, 14, . . . ; 21, 22, 23, 24, . . . ; 31, . . . ; .... Each partial memory contains a data input, a read address RA, a write address WA and a data output.

The required possibility of changing the order of the channels, also referred to as time windows below, in the transmission in the frame at the interface A with respect to the transmission in the frame at the interface B is achieved by means of buffering. All time windows of a frame located, for example, at the input E1 are read into each of the 24 partial memories 11, 21, 31, 41, . . . , with each time window being assigned a separate memory location (not shown), which is equipped with its own read address RA and its own write address WA. The read address RA is connected to a counter 307. The write addresses WA are connected to a time-table, which is designed as the memory 308 of a microprocessor uP1 and is connected to the counter 307. The sequence of the readout is delayed by a time interval of a frame clock, because it may happen that a time window located at the back of a frame must be read out before a time window located in front of it.

The switchable assignment of the individual outputs between the interfaces A and B is carried out by storage in a buffer memory for each time window of a frame, e.g., located at the input E1 in a partial memory 11, 21, 31, 41, . . . . The read address RA of the partial memory 11, 21, 31, 41, . . . is connected to a counter 307, and the write address WA is connected to a time table, which is also coupled with the counter 307. The time table is designed in the form of the memory 308 of the microprocessor uP1 and assigns to the memory contents the intended output.

Since the switchable assignment of the individual outputs and the change in sequence of the time slots are carried out in the same buffer memory 303, the partial memories 11, 21, 31, 41, . . . , that have been described for the switchable assignment of individual outputs, like the memories 11, 21, 31, 41, . . . described for the change in sequence of the channels, are made up of several memory locations, since the same buffer memories 11, 21, 31, 41, . . . are involved.

The individual memory locations (not shown) are designed as so-called FIFO memories (first in-first out), in which the data first read in must also be read out first. The reading in and reading out of the data in the buffer memory 303 occur simultaneously.

The total function of the first part 304 of the partial memory 303 responsible for the downstream direction will be explained below. The frames of the incoming message signals are located at the inputs E1-E24. Each time window of the data portion is read into each partial memory 11, 21, 31, 41, . . . for E1. The preambles of the frames are not used further. Each partial memory contains a number of addressable memory locations corresponding to the number of time windows. The storage capacity of a memory location has a value of eight bits. The read addresses RA of all memory locations of the partial memories 11, . . . , 12, . . . , 13, . . . , 14, . . . are connected to the counter 307, whose time pulse corresponds to the reciprocal length of a time window. The write address WA is connected to the space and time tables, which are designed as a memory 308 and are connected with the microprocessor uP1. The counter pulse is preset by the counter 307. Because the total data content of all inputted frames are present at each output A1-A24 of the portion 304 of the partial memory 303, the desired time window can be supplied to each output by means of the table. The readout sequence can also be established by means of the table.

In order to combine the outgoing data in a frame, an additional partial memory 10, 20, 30, 40, . . . , parallel to the output, is assigned to each output A1-A24, with said partial memory containing several addressable memory locations and, like the other partial memories 11, 12, 13, 14, . . . containing a read address RA connected to the counter 307 and a write address WA connected to the memory 308, and receiving its data for the formation of the preambles from a microprocessor uP0.

FIG. 3 shows the second part 305 of the buffer memory 303, which is responsible for message transmission in the upstream direction. The second part 305, like the first part 304, contains 24 signal inputs E1-E24 and 24 signal outputs A1-A24 which, in each case, are connected in parallel with 24 partial memories located in a line or column and forming a matrix. The mode of operation of the partial memories forming the matrix 306 corresponds to that of the first part 304 described above. The significant difference lies in the arrangement of the additional partial memories 10, 20, 30, 40, . . . , which, in this case, are each connected in parallel with the inputs E1-E24. The additional partial memories 10, 20, 30, 40, . . . in the second half 305, in order to receive and transmit the preambles, are connected to a microprocessor uPA1, uPA2, . . . which is connected to an input in each case.

The evaluation of the TDMA frame and of the TDMA preamble, and the formation of the TDM frame and of the TDM preamble are carried out by means of these microprocessors uPA1, uPA2, . . . , in combination with a central microprocessor uP0.

The frame formation of the time-division multiplex procedure in the network access node 300 in the upstream direction is carried out via partial memories 251, 252, 253, 254, . . . located parallel to the outputs A1–A24 of the part 305 of the partial memory 303, which are connected to the central microprocessor uP0. The read address RA and the write address WA of the additional partial memories are connected to the counter 307 and the memory 308.

The combined action of the individual microprocessors uP0, uP1, uP2, uPA1, uPA2, . . . , in combination with a unit controlling the whole optical digital communication system, which is designated here as the network management 320, will be described below. It is assumed that the network management 320 knows the most favorable connection possibilities between the lines of the interface A and the interface B, on the basis of its information with respect to the occupancy of the lines 1–144 of the interface A, the occupancy of the devices VS1, VS2, D, F and FV connected to this, the occupancy of the lines 1–24 of the interface B, and the occupancy of the front-end devices 324 connected therewith, of the groups of shared connections 311 affiliated therewith, and the occupancy of the shared connections 311. On the basis of this information, the network management 320 is in a position to determine the most favorable connection between the lines 1–144 of the interface A and the lines 1–24 of the interface B, in which case an effort is made to occupy the lines 1–144 of the interface A as completely as possible, which is particularly necessary if individual lines 1–24 at the interface B are insufficiently occupied. This can occur if a front-end device 324, in a sparsely occupied region, is set up with only a small number of subscribers.

The most favorable connection is reported by the network management 320 to the microprocessor uP1 via the microprocessor uP0 for transmission in a downstream direction, and to the microprocessor uP2 via the microprocessor uP0 for the transmission in the upstream direction. The transmission paths in the upstream and downstream directions need not be identical but may be identical.

The network management 320 also knows the position of the time slots for a subscriber with respect to the frame structure during transmission in an upstream and downstream direction in both interfaces A and B, and it correspondingly informs the microprocessors uP1 and uP2 via the microprocessor uP0, of the sequence in which time slots for the burst formation of the frame in question must be read out. The network management 320 is also familiar with the structure of the individual frames. It reports to the microprocessor uP0 for the frame in an upstream direction, in the direction of the interface A. It also reports the structure for the frame during transmission in a downstream direction in the network access node 300 through the microprocessor uP0. The microprocessors uPA1, uPA2, . . . in each case receive their information from the preamble of the incoming message signal of the data directed by the interface B in an upstream direction, which, for example, may contain information about the installation of a new subscriber. The microprocessors uPA1, uPA2, . . . report their information to the central microprocessor uP0, which includes this information in the formation of the preamble of the individual frames and optionally also reports this to the network management 320, for example, if a subscriber is added or removed.

The microprocessors uPA1, uPA2, . . . , in combination with the microprocessors uP0, uP1 and uP2, are thus responsible for the TDM/TDMA formation, whereas only the microprocessors uP1 and uP2, in combination with the central microprocessor uP0, are responsible for the switching of the connections.

The interface A of the network access node 300 contains 144 electric lines with a transmission rate of 2 Mbit/s, while the interface B contains 24 optical lines with a transmission rate of 12 Mbit/s. The adaptation is carried out, on the one hand, by a multiplexer/demultiplexer 309, which, in each case, combines six lines with a transmission rate of 2 Mbit/s into a line with a transmission rate of 12 Mbit/s. This 12 Mbit/s line of the multiplexer/demultiplexer is, in each case, connected with one of the inputs E1–E24 of the first part 304 or with an output A1–A24 of the second part 305 of the buffer memory 303. Between one of the lines of the interface A and the multiplexer 309, there is located, in each case, a coder/decoder device 321, which, for example, converts HDB3-coded signals of a switching point to binary signals or vice versa. The interface A corresponds to the interface G.703 of the CCITT recommendations. The recommendation cites an integer multiple of 64 Kbit/s as the transmission rate.

The outputs A1–A24 of the first part 304 and the inputs E1–E24 of the second part 305 of the buffer memory 303 are, in each case, connected to a multiplexer/demultiplexer 322, which converts the ,net, transmission rate of 12 Mbit/s to a higher transmission rate or a lower transmission rate, since the effective transmission rate between the optical network access node 300 and the shared connections 311 has a value higher than 12 Mbit/s, approximately 30 Mbit/s, because of the protection times, connected with the TDM/TDMA system, between the data trunk groups and the nature of the transmission procedure used in this case, in which the transmission takes place in a periodically alternating manner in the downstream and upstream direction. Electric-to-optical transformers 323 are located between the multiplexer/demultiplexer 322 and the optical lines 1–24 of the interface B. Each line between the buffer memory 303 and the multiplexers 322 is connected with one of the microprocessors uPA1, uPA2, . . . . The microprocessors uPA1, uPA2, . . . are connected in parallel with the central microprocessor uP0. The microprocessor uP0, as already described above, is connected to the buffer memory 303, the microprocessors uP1 and uP2, and the network management 320.

The network node interface 300 according to the invention can be used not only for a digital optical communication system 301, but also, if a transmitting and receiving device of a radio relay or satellite transmission system is provided in place of the electric-to-optical converter 323, and if appropriate base units and relay stations or satellites are present on the subscriber side, can also be used for these communication systems. Also, the message signal can also be modulated onto a line-bound carrier of an electrical communication system.

Because, in the exemplifying embodiment, the communication takes place in a periodically alternating manner on an optical carrier, a wideband signal coupled to the optical waveguide 318 via a fiber coupling can also be transmitted to the subscribers 313.

It is not necessary that a signal with a transmission rate of 2 Mbit/s or 1.5 Mbit/s (SONET) be present at the interface A of the network node interface 300; a message signal with a higher transmission rate, e.g., a wideband signal with a transmission rate of 140 Mbit/s can also be present.

Functions such as the monitoring and control function of a communication system are generally known and will therefore not be explained in greater detail. They can be obtained, for example, from the document EP 0318331 A1, as can the mode of operation of a TDM/TDMA system. Other time-division multiplex systems, such as, for example, a bidirectional TDM system, can also be used instead of the TDM/TDMA system.

What is claimed is:

1. Network electrical/optical access node of a digital communication system for two-way transmission of message signals between first equipment, and second equipment,
   wherein a first type of lines electrically couples the first equipment with a first bidirectional interface of the network access node for transmitting time-division multiplexed message signals at a first lower bit rate in a time-division multiplex hierarchy,
   wherein a second type of lines optically couples the second equipment with a second bidirectional interface of the network access node for transmitting the message signals at a second higher bit rate in a time-division multiple access hierarchy,
   wherein a separate multiplexer/demultiplexer means is provided at each respective first and second bidirectional interface, one multiplexer/demultiplexer means being responsive to the message signals at the first lower bit rate, for providing multiplexed message signals, and vice versa, and the other multiplexer/demultiplexer means being responsive to the message signals at the second higher bit rate, for providing demultiplexed message signals, and vice versa,
   characterized in that
   transmission paths between the first and second types of lines are switchable in the network access node,
   a buffer memory is responsive to the multiplexed message signals and the demultiplexed message signals from the respective separate multiplexer/demultiplexer means, the buffer memory having addressable partial memories for storing the message signals, for switching the transmission paths between the first and second types of lines during communication in both directions between the first and second equipment, and for forming the time-division multiplex message signals, and
   the buffer memory is located between the separate multiplexer/demultiplexer means.

2. A network access node as claimed in claim 1, characterized in
   that the buffer memory includes a first portion and a second portion each having a plurality of addressable partial memories and the partial memories are arranged in the form of a matrix, and
   that the partial memories of each row of the matrix are connected in parallel to one input of the buffer memory, and the partial memories of each column of the matrix are connected in parallel to one output of the buffer memory, or vice versa.

3. A network access node as claimed in claim 2, characterized in that the matrix has additional addressable partial memories associated therewith for generating a preamble for message signals.

4. A network access node as claimed in claim 2, characterized in that in the first portion of the buffer memory, the message signals to be transmitted in a downstream direction are stored, and that in the second portion, the message signals to be transmitted in an upstream direction are stored and data multiplexing and demultiplexing are performed.

5. A network access node as claimed in claim 3, characterized in that the addressable partial memories comprise a number of addressable memory locations which corresponds to a specific number of time windows per time frame of the time-division multiplexed message signals.

6. A network access node as claimed in claim 2, characterized in that channels are addressed between the first and second equipment by a counter, and message signals are read from the partial memories by a table connected to the counter.

7. A network access node as claimed in claim 6, characterized in that the table represents the memory of a microprocessor.

8. A network access node as claimed in claim 2, characterized in that in the first portion, the partial memories of each column of the matrix, which are connected in parallel with one of the outputs, have an additional parallel-connected partial memory associated therewith for carrying out the frame formation of the time-division multiplexed message signals.

9. A network access node as claimed in claim 2, characterized in that in the second portion, partial memories of each row of the matrix, which are connected in parallel with one of the outputs, have an additional parallel-connected partial memory associated therewith, and that partial memories of each column of the matrix, which are connected in parallel with one of the inputs, have an additional parallel-connected partial memory associated therewith for carrying out the frame formation of the time-division multiplexed message signals.

10. A network access node according to claim 1, characterized by the fact that each partial memory has a memory capacity of one byte.

11. A network access node according to claim 1, characterized in that 64 partial memories are combined on an integrated memory chip.

12. A network access node according to claim 1, characterized in that, between the network access node and first equipment there is coupled an adaptation circuit for changing the transmission rate, and optionally if analog signals are present, carries out an analog-digital transformation.

13. A network access node according to claim 4, characterized in that message signals are transmitted in the downstream direction with a time-division multiplex process, and message signals are transmitted in the upstream direction with a time-division multiple access process.

* * * * *

UNITED STATES PATENT AND TRADEMARK OFFICE
CERTIFICATE OF CORRECTION

PATENT NO. : 5,214,638

DATED : May 25, 1993

INVENTOR(S) : Norz et al

It is certified that error appears in the above-identified patent and that said Letters Patent is hereby corrected as shown below:

Title page, item 56, line 4, please change "4,108,546" to --4,198,546--.

Title page, item 56, line 16, please change "310/58.1" to --370/58.1--.

Signed and Sealed this

Fifteenth Day of March, 1994

Attest:

BRUCE LEHMAN

*Attesting Officer*   *Commissioner of Patents and Trademarks*